United States Patent
Jeansonne et al.

(10) Patent No.: US 7,885,205 B2
(45) Date of Patent: Feb. 8, 2011

(54) MEDIA ACCESS CONTROL (MAC) ADDRESS MANAGEMENT SYSTEM AND METHOD

(75) Inventors: Jeffrey Kevin Jeansonne, Houston, TX (US); Terri L. Dunlap, Tomball, TX (US); Wei Ze Liu, Spring, TX (US); Gregory L. Hubbard, Sealy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 332 days.

(21) Appl. No.: 11/787,458

(22) Filed: Apr. 17, 2007

(65) Prior Publication Data

US 2008/0259817 A1 Oct. 23, 2008

(51) Int. Cl.
*H04L 12/28* (2006.01)
(52) U.S. Cl. .................. 370/254; 711/220; 711/221
(58) Field of Classification Search .......... 370/254, 370/389; 711/200–221
See application file for complete search history.

(56) References Cited

U.S. PATENT DOCUMENTS

| | | | | |
|---|---|---|---|---|
| 5,978,590 | A * | 11/1999 | Imai et al. | 717/177 |
| 6,177,860 | B1 * | 1/2001 | Cromer et al. | 340/10.1 |
| 6,609,152 | B1 * | 8/2003 | Ono | 709/222 |
| 2005/0027883 | A1 * | 2/2005 | Carrier | 709/245 |
| 2005/0254489 | A1 * | 11/2005 | Jain et al. | 370/389 |
| 2006/0004980 | A1 * | 1/2006 | Wakayoshi et al. | 711/200 |
| 2006/0020414 | A1 * | 1/2006 | Jiang | 702/122 |
| 2006/0041734 | A1 | 2/2006 | Lim et al. | |
| 2006/0059325 | A1 * | 3/2006 | Milne et al. | 711/200 |
| 2006/0253530 | A1 | 11/2006 | Wu et al. | |
| 2007/0019609 | A1 | 1/2007 | Anjum | |
| 2008/0005343 | A1 * | 1/2008 | Bauman et al. | 709/230 |
| 2008/0056246 | A1 * | 3/2008 | McGee et al. | 370/389 |
| 2009/0182858 | A1 * | 7/2009 | Zhou et al. | 709/223 |

OTHER PUBLICATIONS

PCT International Search Report and Written Opinion of the International Searching Authority, having a date of mailing of Jul. 11, 2008, in co-pending PCT International Patent Application No. PCT/US2008/003107, having an International Filing Date of Mar. 7, 2008 and an applicant of Hewlett-Packard Development Company, L.P., et al. and entitled Media Access Control (MAC) Address Management System and Method.
Ishibashi, K., et al.: "A Proposal of Fast Vertical Handover by Virtual MAC Address Scheme on Mobile Ethernet" by Local and Metropolitan Area Networks, 2004 Lanman 2004 The 13th IEEE Workshop on, Apr. 25-28, 2004, pp. 145-149.
European Patent Office, European Search Report dated Aug. 12, 2010, pp. 5.

* cited by examiner

*Primary Examiner*—Pankaj Kumar
*Assistant Examiner*—Gautam Sharma

(57) ABSTRACT

A media access control (MAC) address management system, comprises logic configured to generate a MAC address for at least one network device of a computing device based on a MAC address of another network device of the computing device.

20 Claims, 2 Drawing Sheets

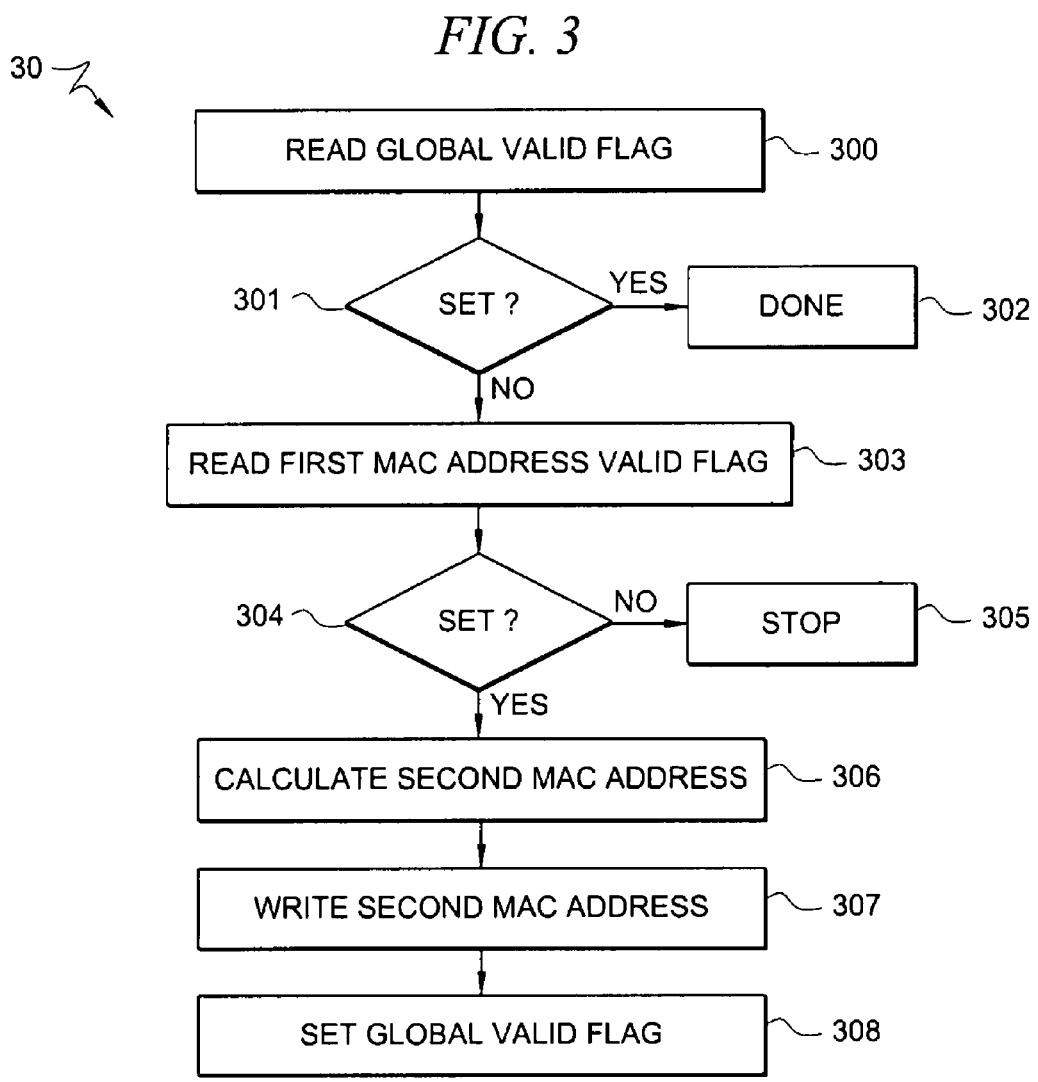

MEDIA ACCESS CONTROL (MAC) ADDRESS MANAGEMENT SYSTEM AND METHOD

BACKGROUND

Computer networks typically require that each device attached to the network have a uniquely identifying communication equipment identification number to use as an electronic address. For example, a widely-used communication equipment identification address is a media access control (MAC) address. MAC address numbers are assigned to equipment manufacturers in blocks, leaving the assignment methods used by the manufacturers unspecified. Computing devices, such as personal computers (PCs), may have multiple devices using a MAC address. For example, a PC may use a network interface controller (NIC) to manage network traffic when a user is using the PC and an administrative network interface for allowing a network administrator to update and otherwise manage the PC even after the user has turned the PC "off." Both the NIC and the administrative network interface have their own MAC address. Thus, the manufacturer and network administrator have the burden of not only managing a longer listing of MAC addresses, but also correlating the multiple MAC addresses for a single PC, each of which is time-consuming and administratively difficult.

BRIEF DESCRIPTION OF THE DRAWINGS

For a more complete understanding of the present application, the objects and advantages thereof, reference is now made to the following descriptions taken in conjunction with the accompanying drawings, in which:

FIG. 2 is a flow diagram illustrating an embodiment of a MAC address management method; and FIG. 3 is another flow diagram illustrating an embodiment of a MAC address management method.

DETAILED DESCRIPTION OF THE DRAWINGS

Figure 1:
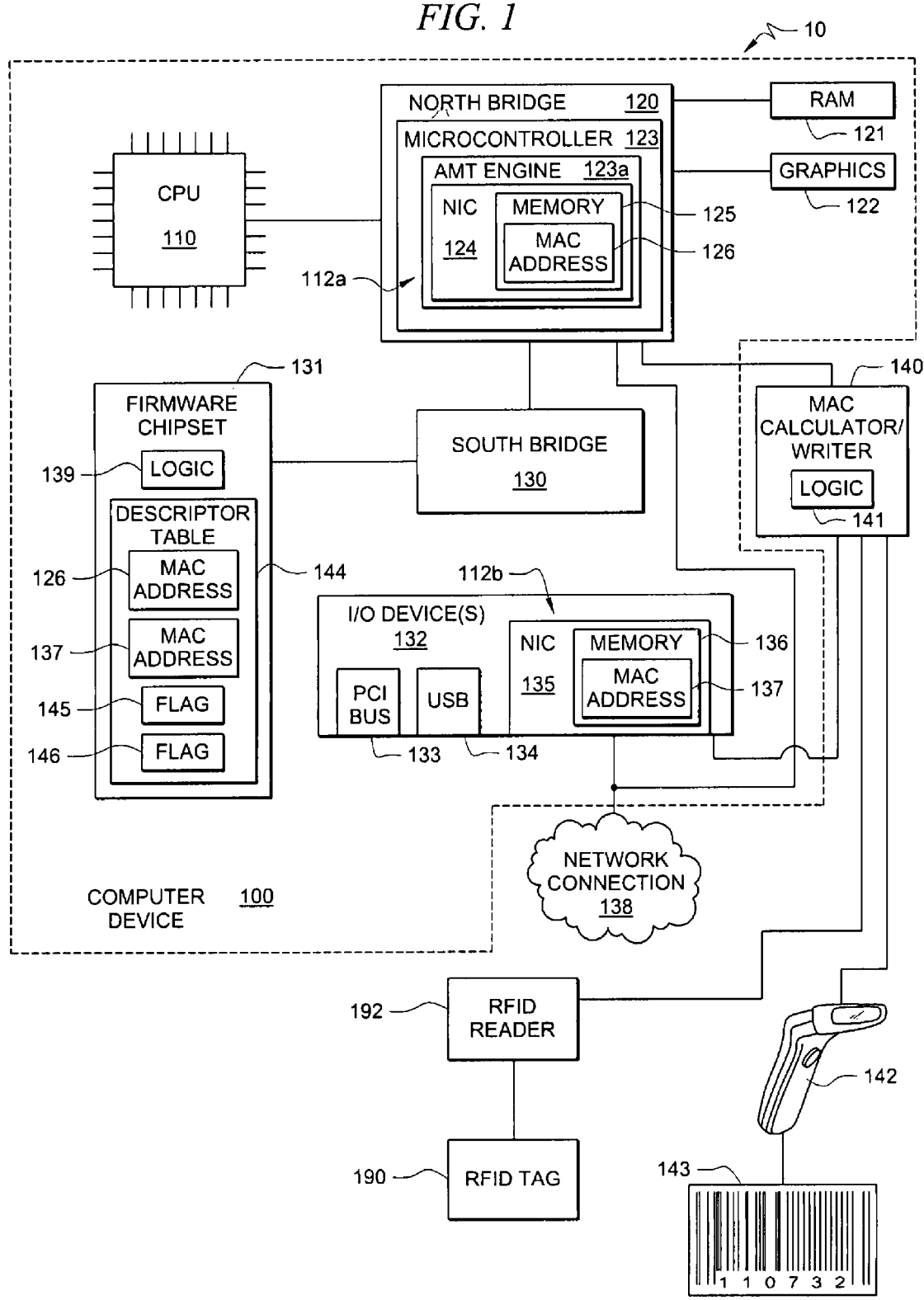
FIG. 1 is a diagram illustrating an embodiment of a media access control (MAC) address management system.

FIG. 1 is a diagram illustrating an embodiment of a media access control (MAC) address management system 10. Generally, a MAC address is a character string used as an electronic address or identifier for a particular device, thereby enabling electronic communications, such as computer network traffic, to be directed to a particular device. MAC addresses are unique, and are typically burned into a device's memory by the manufacturer. To ensure that each device has a unique MAC address, a standards organization provides an entity (e.g., a device manufacturer/distributor) a range of addresses to use for products manufactured/distributed by the particular entity. How the entity allocates the addresses within that range to specific devices is up to the discretion of the entity. When an entity expects to exhaust the provided range of addresses, the entity will generally request that the standards organization reserve another block of addresses. Thus, in operation, each network-capable device will typically be associated with a unique MAC address, for example, by having the MAC address loaded into the device's non-volatile memory.

In the embodiment illustrated in FIG. 1, system 10 is used in connection with a computing device 100. Computing device 100 may comprise any type of electronic device capable of and/or otherwise configured to communicate across a wired and/or wireless network such as, but not limited to, a notebook computer, desktop computer, gaming device, tablet computer, and media device. In the embodiment illustrated in FIG. 1, computing device 100 comprises a central processor (CPU) 110, a northbridge 120, a southbridge 130 and a firmware chipset 131. Northbridge 120 and southbridge 130 are chips, or sets of chips, that communicatively couple CPU 110 to various other devices in computing device 100. For example, northbridge 120 acts as an interface between CPU 110 and southbridge 130, a random access memory (RAM) 121 and a graphics controller 122 of computing device 100. Southbridge 130 acts as a further interface between CPU 110 and firmware chipset 131, such as a basic input/output system (BIOS), and a set of input/output (I/O) devices 132.

In FIG. 1, northbridge 120 comprises a microcontroller 123 which, in some embodiments, is used for network administrative functions. For example, in some embodiments, microcontroller 123 comprises an administrative management technology (AMT) engine 123a used for enabling a network administrator to upgrade software and virus protection for computing device 100 (e.g., even after a user has turned computing device 100 "off"). In some embodiments, microcontroller 123 remains powered and continues operating even if other portions of computing device 100, such as CPU 110 and I/O devices 132, are powered off or otherwise disabled.

In the embodiment illustrated in FIG. 1, computing device 100 comprises two network devices 112a and 112b for enabling communications across and/or over a network in the form of a network interface controller (NIC) 124 and an NIC 135, respectively. However, it should be understood that computing device 100 may comprise a greater or fewer quantity of network devices 112 as well as other types of network devices. In FIG. 1, microcontroller 123 comprises NIC 124 enabling microcontroller 123 to communicate across a computer network, such as a local area network (LAN) or other type of network, via a network connection 138. Thus, in some embodiments, NIC 124 enables microcontroller 123 to receive administrative updates, such as notification of software patches and virus definition files, from a remote network administrator. In the embodiment illustrated in FIG. 1, a MAC address 126 is assigned to NIC 124 and is stored in a memory 125 of NIC 124. MAC address 126 is used to identify NIC 124 to other communication devices on a computer network. In some embodiments, memory 125 comprises Electronically Erasable Programmable Read-Only Memory (EEPROM); however, it should be understood that other forms of non-volatile memory may be used.

In FIG. 1, I/O device(s) 132 are coupled to southbridge 130 and comprise a peripheral component interconnect (PCI) bus 133, a Universal Serial Bus (USB) 134, and NIC 135. NIC 135 is coupled to network connection 138 and provides network connectivity for computing device 100 for a user operating computing device 100, for example, to access the Internet, send e-mail, etc. In the embodiment illustrated in FIG. 1, a MAC address 137 is assigned to NIC 135 and is used to identify NIC 135 to other communication devices on a computer network. In FIG. 1, MAC address 137 is stored in a memory 136 of NIC 135. Memory 136 may comprise EEPROM or other form of non-volatile memory. In some embodiments, NIC 135 comprises a Gigabit Ethernet (GbE) adapter and MAC address 137 comprises a GbE MAC address. However, it should be understood that NIC 135 may be otherwise configured. It should be understood that I/O device(s) 132 may use another device, in addition to NIC 135, to couple to a computer network using MAC address 137. In the embodiment shown in FIG. 1, firmware chipset 131 comprises flash memory, although it should be understood that firmware chipset 131 may comprise additional integrated circuits (ICs) and other forms of memory.

In operation, system 10 enables at least one of MAC addresses 126 and 137 to be loaded into network interface controllers (NICs) 124 and 135, respectively. In operation, as MAC addresses are loaded into computing device 100 and/or otherwise assigned to particular components or devices, the MAC addresses are removed from a reserved block of addresses that were provided to a manufacturer or other entity for assigning to the various devices. In the embodiment illustrated in FIG. 1, computing device 100 comprises two MAC addresses (e.g., MAC addresses 126 and 137); however, it should be understood that computing device 100 may use a greater number of MAC addresses. Thus, for example, as one or both of MAC addresses 126 and/or 137 are loaded into computing device 100 and/or are otherwise assigned to NICs 124 and 135, respectively, both of MAC addresses 126 and 137 are removed from the list of reserved available MAC addresses.

In the embodiment illustrated in FIG. 1, system 10 comprises a MAC calculator/writer 140 coupled to an optical reader 142. In some embodiments, MAC calculator/writer 140 comprises an EEPROM writer configured to write to EEPROMs. However, it should be understood that MAC calculator/writer 140 may comprise other types of writers configured to write to EEPROM and/or another form of non-volatile memory. In some embodiments, MAC calculator/writer 140 is temporarily coupled to computing device 100 (e.g., during the manufacture, maintenance or repair of computing device 100) and is used to write MAC addresses 126 and/or 137 to NICs 124 and 135, respectively. Optical reader 142 may comprise any type of device for reading and/or otherwise acquiring MAC address information that MAC calculator/writer 140 uses to write/assign particular MAC addresses to particular network devices. Optical reader 142 may be temporarily coupled to MAC calculator/writer 140 or form a permanent part of MAC calculator/writer 140. In some embodiments, optical reader 142 is configured to optically read a barcode label 143 having information and/or an indication thereon of a MAC address (e.g., an indication of MAC addresses 126 or 137). In some embodiments, barcode label 143 is affixed to computing device 100, or particular components thereof (e.g., at some point in the process of manufacturing or configuring computing device 100). Thus, in operation, optical reader 142 reads barcode label 143 and transmits the read information (e.g., MAC address information such as MAC addresses 126 or 137) to MAC calculator/writer 140 to facilitate writing/assigning of MAC addresses 126 and/or 137 to NICs 124 and 135, respectively.

In the embodiment illustrated in FIG. 1, MAC calculator/writer 140 comprises logic 141 which may comprise a set of executable instructions embodied in hardware, software stored in a computer-readable storage medium, firmware, or a combination thereof. In some embodiments, logic 141 is configured to calculate, derive and/or generate one MAC address from and/or based on another MAC address. For example, in some embodiments, to facilitate ease of tracking and/or assignment of MAC addresses to computing device 100 and/or devices thereof, logic 141 utilizes a particular algorithm and/or repeatable process for generating and/or deriving one MAC address from and/or based on another MAC address. For example, in some embodiments, logic 141 is configured to generate and/or derive one MAC address from and/or based on another MAC address according to a predetermined alphanumerical relationship (e.g., calculating by incrementing/decrementing by some predetermined alphanumerical value).

In some embodiments, for example, based on a first MAC address, a second MAC address is generated and/or derived by incrementing the first MAC address by the integer one or some other numeric value. However, it should be understood that other methods may be used (e.g., altering particular bits and/or alphanumeric values in a particular MAC address according to a predetermined sequence and/or pattern to generate and/or derive another MAC address).

Thus, in operation, for example, barcode label 143 comprises information associated with a MAC address. Optical reader 142 reads the MAC address information from barcode label 143 and transmits the MAC address information to MAC calculator/writer 140. The received MAC address information may be predestined for a particular device (e.g., NIC 135) or MAC calculator/writer 140 may be configured to select a particular device of computing device 100 for receiving/assigning the MAC address thereto (e.g., based on a predetermined schema or randomly). MAC calculator/writer 140 then writes the MAC address to the particular device (e.g., NIC 135 as MAC address 137). MAC address 137 is correspondingly removed and/or otherwise indicated as being unavailable/assigned on the provided block or range of MAC addresses. Instead of randomly receiving and/or obtaining another MAC address and/or reading another barcode label 143, logic 141 is configured to automatically generate a MAC address for another device of computing device 100 based on the first MAC address or, in this example, MAC address 126. Thus, for example, logic 141 automatically generates a MAC address for NIC 124 based on MAC address 137 (e.g., by incrementing MAC address by a numerical value of "one" to arrive at a MAC address for NIC 124, or MAC address 126). MAC calculator/writer 140 writes MAC address 126 to NIC 124, and MAC address 126 is correspondingly removed and/or otherwise indicated as being unavailable/assigned on the provided block or range of MAC addresses. The above method or series of operations may be repeated for other network devices 112 of computing device 100 needing a MAC address assigned thereto (e.g., generated based on MAC address 137 or generated based on the previously used/assigned MAC address (e.g., MAC address 126)). Alternatively, MAC calculator/writer 140 may be configured to write only one of MAC addresses 126 and 137, leaving calculation of the other one of MAC addresses 126 and 137 to logic 139 in computer 100. Even with this alternative configuration, both MAC addresses 126 and 137 will still be removed and/or otherwise indicated as being unavailable/assigned on the provided block or range of MAC addresses.

It should also be understood that different patterns and/or address assignment methods may be used by logic 141 for assigning MAC addresses to particular types of network devices 112. For example, in some embodiments, a particular type of network device may be designated as a default and/or primary network device 112 (e.g., NIC 135) such that any MAC address assigned to computing device 100 is first assigned to the default/primary network device 112. Thereafter, in some embodiments, another type of network device 112 of computing device 100 is assigned a MAC address by logic 141 based on some incremental value from the MAC address assigned to the default/primary network device, while another type of network device is assigned a MAC address by logic 141 based on a different incremental value from the MAC address assigned to the default/primary network device. Thus, it should be understood that a number of different predetermined methods may be used for assigning MAC addresses to network devices 112 of computing device 100.

In some embodiments, barcode label 143 need not contain all of a MAC address. For example, a manufacturer's block of reserved MAC addresses may be limited to a sequence of numbers in which some of the digits do not change. In such a situation, barcode label 143 may only include a subset or portion of a MAC address. Thus, in some embodiments, logic 141 is configured to append a remaining portion of a MAC address to the information contained on barcode label 143 to generate a complete MAC address.

In some embodiments, a radio frequency identification (RFID) tag 150 may be used to hold and/or otherwise provide an indication of a MAC address, either instead of barcode label 143 or in addition to using barcode labels 143. For example, an RFID tag is a passive wireless device that, in the presence of a transmitting RFID tag reader 152 and in response to being energized by radio frequency energy transmitted by RFID tag reader 152, transmits a code. Thus, in some embodiments, the code transmitted by RFID tag 150 is indicative of a MAC address, which is then transmitted to MAC calculator/writer 140 by RFID tag reader 152. RFID tag 150 may also be thereafter physically coupled to and/or disposed on computing device 100 or a particular network device 112 thereof.

As described above, MAC calculator/writer 140 is configured to generate a MAC address using and/or based on another MAC address. However, it should be understood that MAC calculator/writer 140 may also be configured to determine/derive a MAC address using and/or based on another MAC address. For example, in some embodiments, in response to being given and/or provided with a MAC address for one network device 112 (e.g., MAC address 126), logic 141 is configured to automatically determine and/or otherwise derive what MAC address has been assigned to another network device, such as NIC 135.

In some embodiments, an instance of logic 141 may also reside in firmware chipset 131, indicated as logic 139 in FIG. 1. Logic 139 may be configured the same as logic 141 or may be configured with additional and/or different functionality than logic 141. For example, in some embodiments, logic 139 is configured to calculate and/or derive one of MAC addresses 126 and 137 from and/or based on the other one of MAC addresses 126 and 137 (e.g., during computing device 100 boot-up). For example, in some embodiments, if MAC address 126 had not been written to memory 125 of NIC 124, logic 139 is configured to read MAC address 137 from memory 136, calculate MAC address 126, and write MAC address 126 to memory 125 (e.g., when computing device 100 is booted or otherwise). Logic 139 may also be configured to derive and/or otherwise determine one MAC address from another MAC address (e.g., determine MAC address 126 based on MAC address 137) to facilitate communication of the particular MAC address to another (e.g., to another network device, to a system/network administrator, etc.).

In the embodiment shown in FIG. 1, firmware chipset 131 also comprises a descriptor table 144 holding copies of MAC addresses 126 and 137 and validity flags 145 and 146. In some embodiments, MAC calculator/writer 140 writes MAC addresses 126 and/or 137 to descriptor table 144 in addition to, or instead of, memory 125 and memory 136, respectively. Logic 139 may also be configured to copy MAC addresses 126 and/or 137 from descriptor table 144 to memory 125 and/or memory 136, respectively, upon computing device 100 boot-up or otherwise. In some embodiments, flags 145 and 146 represent validity indications for MAC addresses 126 and 137. For example, in some embodiments, MAC calculator/writer 140 sets flag 145 if MAC calculator/writer 140 writes MAC addresses 126 and 137 to NIC 124 and NIC 135.

If, however, MAC calculator/writer 140 writes only one of MAC addresses 126 or 137 to NIC 124 or NIC 135, and one of NIC 124 and NIC 135 is thus missing a valid MAC address, MAC calculator/writer sets flag 146 but not flag 145. In some embodiments, upon booting, logic 139 determines whether both MAC addresses 126 and 137 are both valid, based on whether flag 145 is set, and if not, calculates the missing one of MAC address 126 or 137, writes MAC addresses 126 or 137 to descriptor table 144 and/or the respective one of memory 125 or memory 136, and sets flag 145. Descriptor table 144 may also be locked once valid MAC addresses have been stored in memories of the respective network devices. During later booting events, logic 139 may thus read flag 145 as being set.

FIG. 2 is a flow diagram illustrating an embodiment of a method 20 for writing a MAC address. Method 20 is described with reference to system 10 illustrated in FIG. 1; however, it should be understood that method 20 may be used with alternative embodiments. At block 200, MAC calculator/writer 140 receives MAC address 137 from optical reader 142. At block 201, MAC calculator/writer 140 writes MAC address 137 to memory 136 and sets flag 146 at block 202.

FIG. 3 is a flow diagram illustrating an embodiment of a method 30 for writing a MAC address. Method 30 is described with reference to system 10 illustrated in FIG. 1; however, it should be understood that method 30 may be used with alternative embodiments.

At block 300, logic 139 reads flag 145 and determines whether flag 145 is set at decision block 301. If flag 145 is set, method 30 is done at block 302. If, however, flag 145 is not set, logic 139 reads flag 146. If flag 146 is not set, method 30 stops at block 305, because flag 146 not being set indicates that MAC address 137 has not yet been written to memory 136, and is therefore not available for calculating MAC address 126. If, however, flag 145 is set, logic 139 reads MAC address 137 from memory 136 and calculates MAC address 126 at block 306. At block 307, logic 139 writes MAC address 126 to memory 125, and at block 308, logic 139 sets flag 145.

What is claimed is:

1. A media access control (MAC) address management system, comprising:
   a processor;
   a storage device;
   a first network device;
   a second network device; and
   a tangible, machine readable storage medium comprising code configured to direct the processor to:
      retrieve a first MAC address of the first network device from a reserved block of MAC addresses;
      generate a second MAC address by incrementing the first MAC address by one;
      assign the second MAC address to the second network device;
      write the second MAC address to a memory;
      locate the second MAC address in the reserved block of MAC addresses; and
      mark the second MAC address as unavailable in the reserved block of MAC addresses.

2. The system of claim 1 wherein the code is configured to write the second MAC address to a memory of the second network device.

3. The system of claim 1 wherein the code is configured to write the generated MAC address to a descriptor table, wherein the tangible, machine readable storage medium comprises the descriptor table.

4. The system of claim 1 wherein the tangible, machine readable storage medium comprises a chipset, and wherein the chipset comprises a descriptor table.

5. The system of claim 1 wherein the code is configured to increment the second MAC address by a predetermined value.

6. The system of claim 1 wherein the code is configured to generate the second MAC address for an administrative management technology (AMT) engine, wherein the tangible, machine readable storage medium comprises the AMT engine.

7. The system of claim 1 wherein the tangible, machine readable storage medium comprises a MAC calculator/writer removably couplable to the MAC address management system.

8. The system of claim 1 wherein the code is configured to generate the second MAC address in response to booting of the MAC address management system.

9. The system of claim 1 further comprising a flag indicating a validity of the second MAC address for the second network device.

10. A method for writing a media access control (MAC) address, the method comprising:
retrieving a first MAC address from a reserved block of MAC addresses;
assigning the first MAC address to a first component of a computer device;
deriving a second MAC address from the first MAC address;
assigning the second MAC address to a second component of the computer device and writing the second MAC address to memory; and
locating the second MAC address in the reserved block of MAC addresses and setting the second MAC address as unavailable in the reserved block of MAC addresses.

11. The method of claim 10 further comprising reading an indication of a validity of the second MAC address.

12. The method of claim 10 wherein writing the second MAC address to memory comprises writing the second MAC address to a memory of a network device.

13. The method of claim 10 wherein writing the second MAC address to memory comprises writing the second MAC address to a descriptor table.

14. The method of claim 10 wherein deriving a second MAC address from a first MAC address comprises incrementing the first MAC address by a predetermined value.

15. The method of claim 10 further comprising optically reading a label displaying at least a portion of the first MAC address and deriving a MAC address for each of a plurality of components of the computing device by incrementing the first MAC address by one for each of the plurality of components and removing the derived MAC addresses from the reserved block of MAC addresses.

16. A system for writing a media access control (MAC) address, the system comprising:
means for retrieving a first MAC address from a reserved block of MAC addresses; and
means for deriving a second MAC address from the first MAC address and for writing the second MAC address to a memory means, where the means for deriving is configured to perform operations comprising:
assigning the first MAC address to a first component of a computer device;
deriving the second MAC address from the first MAC address;
assigning the second MAC address to a second component of the computer device; and
locating the second MAC address in the reserved block of MAC addresses and setting the second MAC address as unavailable in the reserved block of MAC addresses.

17. The system of claim 16 wherein the memory means comprises nonvolatile memory means.

18. The system of claim 16 wherein the means for deriving comprises means for performing an arithmetic operation.

19. The system of claim 16 further comprising means to input the first MAC address.

20. The system of claim 19 wherein the means to input comprises at least one of an optical reading means and a radio frequency identification (RFID) means; and
where the means for deriving is configured to generate a MAC address for each of a plurality of components of the computing device by incrementing the first MAC address by one for each of the plurality of components and removing the derived MAC addresses from the reserved block of MAC addresses.

* * * * *